(12) United States Patent
Becker et al.

(10) Patent No.: US 10,409,822 B2
(45) Date of Patent: Sep. 10, 2019

(54) SYSTEMS AND METHODS FOR PRESENTING RANKED SEARCH RESULTS

(71) Applicant: Shutterstock, Inc., New York, NY (US)

(72) Inventors: Chris Becker, New York, NY (US); David Kroner, Brooklyn, NY (US); Steve Blaurock, Queens, NY (US)

(73) Assignee: Shutterstock, Inc., New York, NY (US)

( * ) Notice: Subject to any disclaimer, the term of this patent is extended or adjusted under 35 U.S.C. 154(b) by 621 days.

(21) Appl. No.: 14/697,914

(22) Filed: Apr. 28, 2015

(65) Prior Publication Data

US 2015/0324365 A1     Nov. 12, 2015

Related U.S. Application Data (60) Provisional application No. 61/988,962, filed on May 6, 2014.

(51) Int. Cl.
  *G06F 16/24*     (2019.01)
  *G06F 16/2457*   (2019.01)
  (Continued)

(52) U.S. Cl.
  CPC ...... *G06F 16/24578* (2019.01); *G06F 16/248* (2019.01); *G06F 16/313* (2019.01); *G06F 16/5838* (2019.01); *G06F 16/5866* (2019.01)

(58) Field of Classification Search
  CPC ................................................ G06F 16/24578
  (Continued)

(56) References Cited

U.S. PATENT DOCUMENTS

| 5,086,295 A | 2/1992 | Boettcher et al. |
| 5,299,116 A | 3/1994 | Owens et al. |

(Continued)

FOREIGN PATENT DOCUMENTS

| WO | WO 2014070168 | 5/2014 |
| WO | WO2014070914  | 5/2014 |

OTHER PUBLICATIONS

Flickner, et al., "Query by image and video content: The QBIC system," Computer 28(9), pp. 23-32 1995.

(Continued)

*Primary Examiner* — Syling Yen
(74) *Attorney, Agent, or Firm* — McDermott Will & Emery LLP (57) ABSTRACT

A method and system for ranking images in response to a user presenting search criteria on a user interface of a computing device, comprising (1) searching a first database to locate a set of pertinent images satisfying the search criteria, (2) extracting a set of suggested color palettes from the set of images, (3) processing each color palette from the set of suggested color palettes by iteratively performing the following operations: (a) identifying a next color palette, (b) identifying a set of images from which the next color palette is extracted from, (c)) determine a set of parameters of a first set of operations, and (d) ascertaining an image rank measure for each image from the set of images by performing the first set of operations, and (4) generating a ranked display of the set of images based on the image rank measure.

16 Claims, 6 Drawing Sheets
(6 of 6 Drawing Sheet(s) Filed in Color)

(51) Int. Cl.
*G06F 16/248* (2019.01)
*G06F 16/31* (2019.01)
*G06F 16/583* (2019.01)
*G06F 16/58* (2019.01)

(58) Field of Classification Search
USPC .................. 707/706, 722, 736, 758, 781
See application file for complete search history.

(56) References Cited

U.S. PATENT DOCUMENTS

| | | | |
|---|---|---|---|
| 5,307,182 | A | 4/1994 | Maltz |
| 5,313,231 | A | 5/1994 | Yin et al. |
| 5,434,957 | A | 7/1995 | Moller |
| 6,185,385 | B1 | 2/2001 | Mestha et al. |
| 6,385,336 | B1 | 5/2002 | Jin |
| 6,518,981 | B2 | 2/2003 | Zhao |
| 6,859,210 | B2 | 2/2005 | Luo |
| 7,023,577 | B2 | 4/2006 | Watanabe |
| 7,126,612 | B2 | 10/2006 | Sekiguchi |
| 7,715,624 | B2 | 5/2010 | Nishida |
| 7,864,999 | B2 | 1/2011 | Chang et al. |
| 7,873,521 | B2 | 1/2011 | Kurozumi et al. |
| 8,502,864 | B1 | 8/2013 | Watkins |
| 8,508,547 | B2 | 8/2013 | Klassen |
| 8,576,241 | B1 | 11/2013 | Kanter et al. |
| 8,587,604 | B1* | 11/2013 | Kanter ............... G06F 17/3025 345/581 |
| 8,593,478 | B2 | 11/2013 | O'Brien-Strain |
| 8,630,485 | B2 | 1/2014 | Cok |
| 8,634,640 | B2 | 1/2014 | Bhatti |
| 8,756,241 | B1 | 6/2014 | Thite |
| 8,890,884 | B2 | 11/2014 | Zhang |
| 9,002,100 | B2 | 4/2015 | Lecerf |
| 9,390,168 | B1 | 7/2016 | Dykstra et al. |
| 9,582,517 | B2 | 2/2017 | Chester et al. |
| 9,792,303 | B2 | 10/2017 | Sayre, III et al. |
| 2001/0003814 | A1* | 6/2001 | Hirayama ............... G06Q 30/02 705/52 |
| 2002/0080153 | A1 | 6/2002 | Zhao et al. |
| 2002/0094124 | A1* | 7/2002 | Kim ................... G06F 17/3025 382/167 |
| 2005/0055344 | A1 | 3/2005 | Liu et al. |
| 2006/0193538 | A1* | 8/2006 | Vronay ............ G06F 17/30274 382/305 |
| 2006/0195325 | A1* | 8/2006 | Tateson ............ G06F 17/30648 705/1.1 |
| 2006/0218522 | A1 | 9/2006 | Hanechak |
| 2006/0248081 | A1 | 11/2006 | Lamy |
| 2007/0188445 | A1 | 8/2007 | Silverstein et al. |
| 2007/0188478 | A1 | 8/2007 | Silverstein |
| 2008/0046409 | A1 | 2/2008 | Lieb |
| 2008/0046410 | A1 | 2/2008 | Lieb |
| 2009/0003892 | A1 | 1/2009 | Sakaizawa |
| 2009/0041345 | A1 | 2/2009 | Tirumalareddy et al. |
| 2009/0252404 | A1 | 10/2009 | Lecerf |
| 2009/0281925 | A1 | 11/2009 | Winter et al. |
| 2010/0158412 | A1 | 6/2010 | Wang et al. |
| 2011/0085697 | A1 | 4/2011 | Clippard et al. |
| 2011/0135195 | A1 | 6/2011 | Marchesotti et al. |
| 2011/0184950 | A1 | 7/2011 | Skaff et al. |
| 2011/0191334 | A1 | 8/2011 | Hua et al. |
| 2011/0289082 | A1 | 11/2011 | Townsend |
| 2011/0313927 | A1 | 12/2011 | Savilia et al. |
| 2012/0045121 | A1 | 2/2012 | Youngman et al. |
| 2012/0075329 | A1 | 3/2012 | Skaff et al. |
| 2012/0099784 | A1 | 4/2012 | Marchesotti et al. |
| 2012/0163710 | A1* | 6/2012 | Skaff ................... G06F 17/3025 382/165 |
| 2012/0166472 | A1 | 6/2012 | Hoppenot et al. |
| 2012/0189340 | A1 | 7/2012 | Hagiwara |
| 2012/0224764 | A1 | 9/2012 | Weng |
| 2012/0239506 | A1 | 9/2012 | Saunders et al. |
| 2012/0254790 | A1 | 10/2012 | Colombino et al. |
| 2013/0073336 | A1 | 3/2013 | Heath |
| 2014/0019484 | A1 | 1/2014 | Coppin et al. |
| 2014/0055484 | A1 | 2/2014 | Moon |
| 2014/0089295 | A1 | 3/2014 | Becherer et al. |
| 2014/0096009 | A1 | 4/2014 | Grosz et al. |
| 2014/0201634 | A1 | 7/2014 | Hill |
| 2014/0270498 | A1 | 9/2014 | Chester et al. |
| 2014/0304661 | A1 | 10/2014 | Topakas et al. |
| 2014/0334722 | A1 | 11/2014 | Bloore et al. |
| 2015/0039994 | A1* | 2/2015 | Hoguet ................... G09G 5/06 715/234 |
| 2015/0046254 | A1 | 2/2015 | Raab et al. |
| 2015/0081469 | A1 | 3/2015 | Acharyya et al. |
| 2015/0110381 | A1 | 4/2015 | Parvin et al. |
| 2015/0170380 | A1 | 6/2015 | Duwenhorst |
| 2015/0181469 | A1 | 6/2015 | Yu |
| 2015/0199010 | A1 | 7/2015 | Coleman et al. |
| 2015/0220578 | A1 | 8/2015 | Hunt et al. |
| 2015/0310010 | A1 | 10/2015 | Brenner et al. |
| 2015/0324366 | A1 | 11/2015 | Becker et al. |
| 2015/0324392 | A1 | 11/2015 | Becker et al. |
| 2015/0324394 | A1 | 11/2015 | Becker et al. |
| 2015/0378999 | A1 | 12/2015 | Dorner et al. |
| 2015/0379004 | A1 | 12/2015 | Sayre, III et al. |

OTHER PUBLICATIONS

Smith, et al., "VisualSEEK: a fully automated content-based image query system", In Proceedings of the fourth ACM International Conference on Multimedia, pp. 87-89, ACM, 1997.

* cited by examiner

| NO | Extracted color Palette | Keyword | Customer satisfaction measure | Image | rank |
|----|-------------------------|---------|-------------------------------|----------|------|
| 1  | palette 1 | A | 100 | image 1  | 7  |
| 2  | palette 1 | B | 300 | image 2  | 1  |
| 3  | palette 1 | C | 60  | image 3  | 11 |
| 4  | palette 1 | D | 120 | image 4  | 5  |
| 5  | palette 2 | E | 20  | image 5  | 15 |
| 6  | palette 2 | F | 30  | image 6  | 14 |
| 7  | palette 2 | G | 50  | image 7  | 12 |
| 8  | palette 2 | H | 70  | image 8  | 10 |
| 9  | palette 3 | I | 10  | image 9  | 16 |
| 10 | palette 3 | J | 110 | image 10 | 6  |
| 11 | palette 3 | K | 200 | image 11 | 3  |
| 12 | palette 3 | L | 220 | image 12 | 2  |
| 13 | palette 4 | M | 40  | image 13 | 13 |
| 14 | palette 4 | N | 80  | image 14 | 9  |
| 15 | palette 4 | O | 90  | image 15 | 8  |
| 16 | palette 4 | P | 190 | image 16 | 4  |

FIGURE 5

|       | Column 1 | Column 2 | Column 3 | Column 4 |
|-------|----------|----------|----------|----------|
| Row 1 | image 2  | image 12 | image 11 | image 16 |
| Row 1 | image 4  | image 10 | image 1  | image 15 |
| Row 1 | image 14 | image 8  | image 3  | image 7  |
| Row 1 | image 13 | image 6  | image 5  | image 9  |

FIGURE 6

|       | Column 1 | Column 2 | Column 3 | Column 4 |
|-------|----------|----------|----------|----------|
| Row 1 | image 2  | image 4  | image 14 | image 13 |
| Row 1 | image 12 | image 10 | image 8  | image 6  |
| Row 1 | image 11 | image 1  | image 3  | image 5  |
| Row 1 | image 16 | image 15 | image 7  | image 9  |

SYSTEMS AND METHODS FOR PRESENTING RANKED SEARCH RESULTS

BACKGROUND

1. Field of Disclosure

The present disclosure generally relates to an image ranking system, and, more particularly, to systems and methods for ranking images by aggregating the customer behavior scores for the search query across all images in response to a user presenting search criteria on a user interface of a computing device.

2. Background of the Invention

Searching pertinent images over the Internet can be a particularly challenging task for artists and designers. The commercial systems may require an artist to select a single image from a pool of millions of images that may be retrieved for a keyword search query. In marketing, the precise image selection for a product may directly be linked with the commercial success of a product. An artist may be required to conduct a complex search query to perform an image search based on a keyword and a color. In that case, artists may have to create and discover color palettes to meet their business needs or aesthetic tastes. When an artist is searching for the keyword "ocean," the Internet search engine may return a large number of images associated with the keyword ocean in various colors and shades.

Organizing the images in the result set containing millions of images in various colors and shades is a challenging task nevertheless. A determination has to be made about which images are to be displayed and where the images are to be displayed on the user interface. It is desired to have a method of ranking image search results and displaying the ranked search results.

BRIEF SUMMARY

By way of introduction only, the present embodiments provide a method and system for conducting image search comprising: searching a first database to locate a set of pertinent images, iteratively performing the following operations for each image in the set of pertinent images (a) extracting the histogram of red green and blue colors (RGB colors) from a given image (b) distilling the extracted RGB colors down to create a reduced color palette for the given image (c) segmenting the extracted RGB colors into a set of segments representing distinct parts of the color spectrum (d) selecting a subset from the set of segments to assemble a color palette for the given image (e) updating the assembled color palette and a customer behavior score for the given image in the first database; and generating a ranked display of suggested color palettes for the search query by aggregating the customer behavior scores for the search query across all images.

The disclosed system may present users with multicolor palettes that best match the searched concept and the keyword. Among the presented multicolor palettes, a specific multicolor palette can be selected by the user in order to retrieve all images in the given image depository that match the specific palette and the user specified keyword. Alternatively, the disclosed system may allow the user to create a palette and retrieve all images in the image depository that match the user specified palette and the user specified keyword.

According to one aspect of the present invention, systems and methods are disclosed for generating color palettes from the given image depository in response to a user query. In one embodiment of the disclosed system, a high volume of color combinations can be generated automatically for a search query.

According to another aspect of the present invention, systems and methods are disclosed for designing a color palette. When an artist is searching for the keyword "ocean," the Internet search engine may return a large number of images associated with the keyword ocean in various colors and shades. For example, the above mentioned query may return color palettes containing various shades of blue from the photos of water, various shades of browns from the photos of beaches, the various shades of reds from photos of ocean sunsets, and the like.

In another embodiment, the system has an ability to display trends for a given image. Thus, the user can optionally select an image that was downloaded by many other users. Accordingly, the system may define popular palettes for certain groups of customers. For example, a popular palette may indicate specific images that are popular among college students just in time for Valentine's Day. In another embodiment, the system may have the ability to suggest color themes based on seasonal or popular trends, like certain red and green palettes may be especially popular around Christmas time.

In yet another embodiment, the system has an ability to help customers configure their desired palettes. Additionally, the system may allow the customers to discover palettes configured by others as well as save or export a particular palette that is of interest to the customer. This may save customer time, money and other resources required to reinvent that palette that works for the customer.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

In another embodiment, relevant search queries are further sorted by using user search data to score color palettes by the keyword. Thus, a high volume of color combinations can be applied to locate relevant images in response to the search queries.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 7 depicts manner in which the customer behavior scores per keyword are added up from each image that the color palette was extracted from.

DETAILED DESCRIPTION OF THE PRESENTLY PREFERRED EMBODIMENTS

The present invention provides methods and systems for ranking images in response to receiving user search criteria on a user interface of a computing device. The method may comprise the steps of (1) searching a first database to locate a set of pertinent images satisfying the search criteria, (2) extracting a set of suggested color palettes from the set of images, (3) processing each color palette from the set of suggested color palettes by iteratively performing the following operations: (a) identifying a next color palette, (b) identifying a set of images from which the next color palette is extracted from, (c) determine a set of parameters of a first set of operations, and (d) ascertaining an image rank measure for each image from the set of images by performing the first set of operations, and (4) generating a ranked display of the set of images based on the image rank measure.

Figure 1:
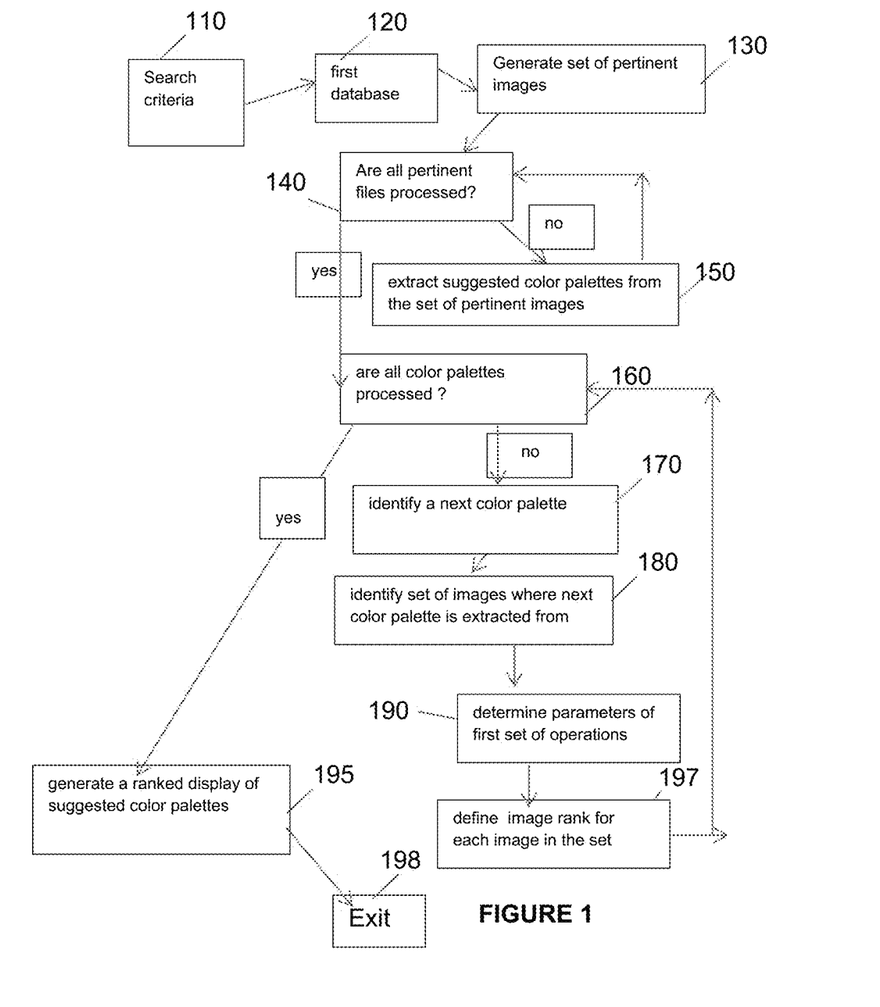
FIG. 1, illustrates a flow chart depicting various steps performed in ranking images in response to a user presenting search criteria on a user interface of a computing device.

Now referring to FIG. 1, illustrating a flow chart depicting various steps performed in ranking images in response to a user presenting search criteria on a user interface of a computing device according to the preferred embodiment of the disclosed method. The process may receive a search query from a user via a user interface of a computing device, not shown in FIG. 1, at block 110.

The search query may indicate a user's interest in searching images for the specified keyword for example, a sea. Notably, the user may not specify a color of desired image at this point. However, in another embodiment, the user may indicate the intended image color and shade. The process may conduct image search based on the user specified keyword and color constraint(s).

The process may, at block 120, search a first database to retrieve all the images that satisfy the keyword criterion specified in the search query. All the images that meet the searched keyword criteria are herein referred to as a set of pertinent images, since these images may possibly be of interest to the user. In other words, the process may search a first database to locate a set of pertinent images corresponding to the search query. At block 130, the process may generate a set of pertinent images for the user after searching the first database at block 120.

The first database may comprise several records, each record may have an associated image representation (image), a set of keywords associated with the image. Furthermore, each record may also have a customer behavior score for each keyword in the set of keywords, and a list of keywords that were previously used by other users to locate the image.

In one embodiment of the disclosed invention, the customer behavior score is based on aggregate user activity for an image. This may include searches that were conducted in the past which led the user to indicate interest in the given image. User interest is indicated by the user purchasing the image, the user clicking on the image, or displaying other signals indicating the user's interest in that image. In this context, the other signals may include for example, the user adding the image to a lightbox or favorites list, and hovering the cursor over the thumbnail image to view a larger preview, or performing any of the above mentioned activities on images contributed by the same artist from the same photo shoot or illustrated image set. In this embodiment of the disclosed invention, the customer behavior scores may be aggregated per search query and used to identify the most relevant keywords or categories for an image.

In another embodiment of the disclosed invention the customer behavior scores may be aggregated over a period of time and may represent customer activity for a specific period of interest such as a season. For example, an abstract image of a red and green background may generate more customer interest in the Christmas season. As a result, the image is likely to receive a disproportionate number of its annual purchases during the three month period prior to Christmas time as compared to other images having the color schemes that are unrelated to Christmas. If a particular image received higher volume of customer activity during a specific time of the year, then the disclosed search system can rank the particular image higher in results during the same time of year. For example, if 30% of the total image downloads for image A had occurred in the month of November, and for 10% of total image downloads for image B had occurred in the month of November, then the image A will be ranked higher than image B in search results during the month of November.

The first database may also contain a download count for each keyword associated with each image from the set of images, wherein the download count for a given keyword associated with a given image may specify the number of times the given image was downloaded by customers conducting image search for the given image using the given keyword. A total number of downloads count for each image from the set of images may also be stored in the first database. The total number of download counts for a given image may indicate the number of times the given image has been downloaded by customers since the image was added to the first database.

Similarly, the first database may store a color volume count for an individual color for each image from the set of images, wherein the color volume count for an image may reflect the percentage of the image that is covered by the individual color. Further the first database may indicate a color weight count for an individual color for each image from the set of images, wherein the color volume count for an image ma indicate the percentage of the image that is covered by the individual color. Additionally, an age count for each image from the set of images may also be included in the first database, the age count for a given image may indicate the time when the given image added to the first database.

At block 140, the process may determine whether all of the pertinent images generated at block 130 are processed. If the process determines that all pertinent files have not yet been processed, then the process may iteratively perform the operations described in conjunction with blocks 140-150 for each image in the searched set of pertinent images. In other words, the process may iteratively extract a set of suggested color palettes from the set of pertinent images until each image in the searched set of pertinent images is processed. The manner in which the color palettes are extracted from a set of images is described in detail in a pending patent application, application number to be determined, titled "Systems and methods for color palette suggestions," which is incorporated herein by reference and also claims priority to provisional patent application 61/988,962 filed May 6, 2014, the application number to be determined. For the sake of brevity, the description of the process of extracting the color palettes from a set of images is not included in this application.

The process may, at block 160, determine whether each color palette in the set of color palettes extracted at step 150 has been processed. If at block 160 it is determined that each color palette in the extracted set of color palettes has not yet been processed, the process may identify a next color palette at block 170. In this context, the term "next color palette" indicates a particular palette from the extracted set of color palettes upon which the operations described in conjunction with blocks 170-197 have not yet been performed.

In other words, the disclosed method may process each color palette from the extracted set of suggested color palettes by iteratively performing the operations indicated in blocks 170-197. Accordingly, the process may iteratively perform the operations described in conjunction with blocks 170-197 until all the images for each color palette from the extracted set of suggested color palettes is processed. At block 180, the process may identify a set of images from which the next color palette is extracted from. At block 190, the process may determine a set of parameters of a first set of operations, this process is described in detail in conjunction with FIG. 2. The process may then ascertain an image rank measure for each image from the set of images by performing at block 197 the first set of operations, parameters of which have been configured at block 190.

The process may then move to block 160 to ascertain whether each color palette in the extracted set of color palettes has been processed. If at block 160 it is determined that each color palette in the extracted set of color palettes has been processed, the process may generate a ranked display of the set of images associated with the set of suggested color palettes based on the image rank measure at block 195 before exiting at block 198.

Figure 2:
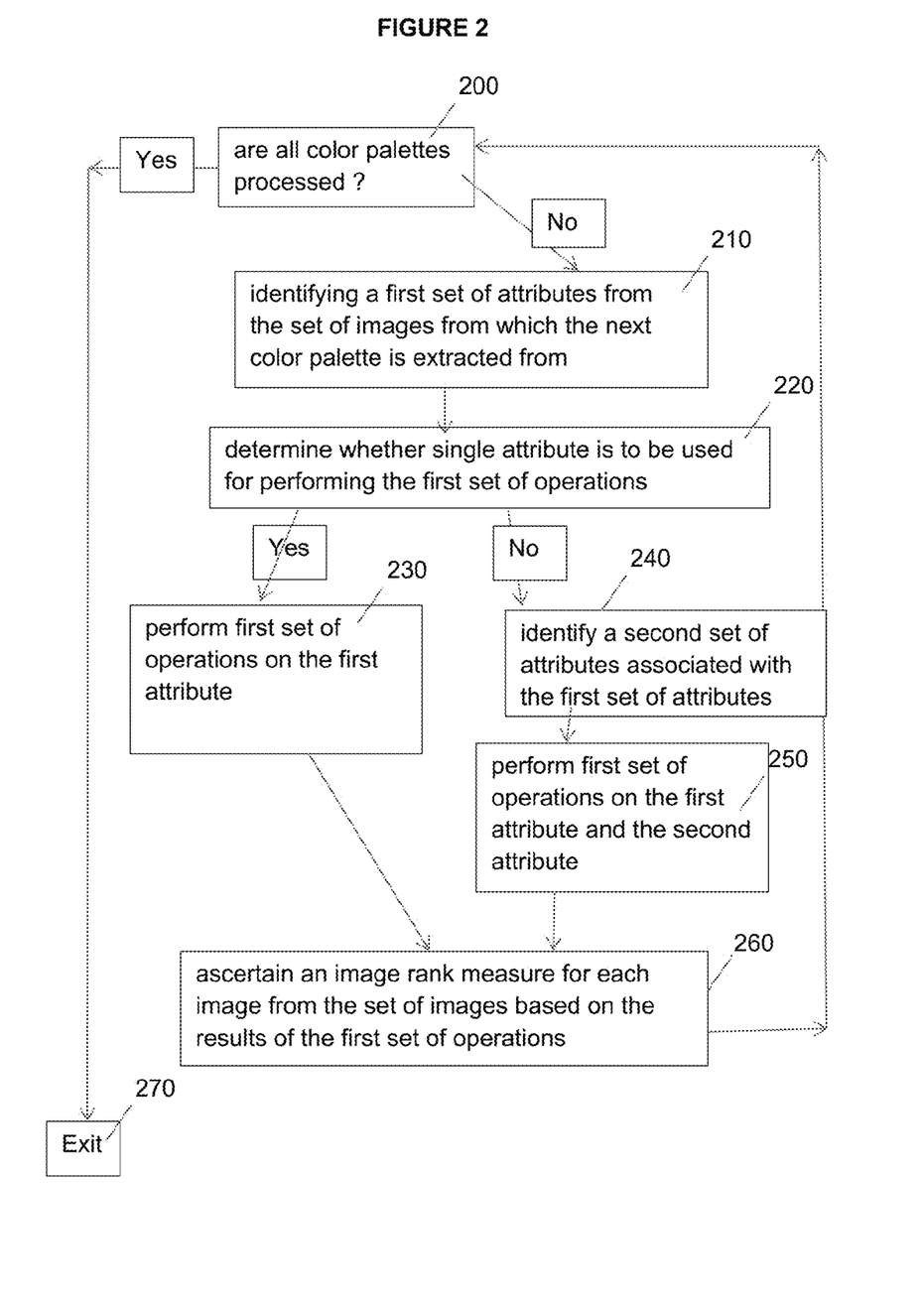
FIG. 2 illustrates manner in which the disclosed process may determine a set of parameters of a first set of operations.

The manner in which a set of parameters of a first set of operations is determined is depicted via a control flow diagram shown in FIG. 2. At block 200, the process may determine whether all color palettes are processed, if so the process may exit at block 270. Otherwise, the process may identify a next color palette and move to block 210 for identifying a first set of attributes from the set of images from which the next color palette is extracted from. The process may at block 220 determine whether a single attribute is to be used for performing the first set of operations. In other words, the disclosed method may include the steps of determining whether a single attribute is to be used for performing the first set of operations, identifying a first set of attributes from the set of images from which the next color palette is extracted from, and optionally identifying a second set of attributes associated with the first set of attributes. Upon determining, at block 220, that a single attribute is to be used for performing the first set of operations, the process may move to block 230 to perform first set of operations on the first attribute and then proceed to block 260.

Alternatively, if at block 220 it is determined that multiple attributes are to be used for performing the first set of operations, the process may move to block 240 to identify a second set of attributes associated with the first set of attributes before proceeding to block 250 to perform first set of operations on the first attribute and the second attribute.

Notably, the process may, optionally, iteratively identify more sets of attributes if more than two sets of attributes are desired for performing the first set of operations and perform the first set of operations on the identified sets of attributes.

From both blocks 230 and 250, the process may move to block 260 to ascertain an image rank measure for each image from the set of images based on the results of the first set of operations before returning to block 200. Thus, depending upon the parameters configured at step 190 in FIG. 1, the disclosed method may comprise the step of ascertaining the image rank measure for each image from the set of images based on the second set of attributes by performing the first set of operations using the first set of attributes and optionally the second set of attributes.

The disclosed process may comprise the step of maintaining in the first database: an image representation (image), a set of keywords associated with the image, a customer behavior score for each keyword in the set of keywords, and a list of keywords previously used to locate the image. In one embodiment of the disclosed method the first set of attributes may comprise a set of keywords associated with each image from the set of images, and the second set of attributes may comprise a set of customer satisfaction scores associated with each keyword in the set of keywords. In this embodiment, the first set of operations may comprise aggregating the customer behavior scores for each keyword across all images from which the next color palette was extracted from. This embodiment is illustrated in FIG. 3.

Figure 3:
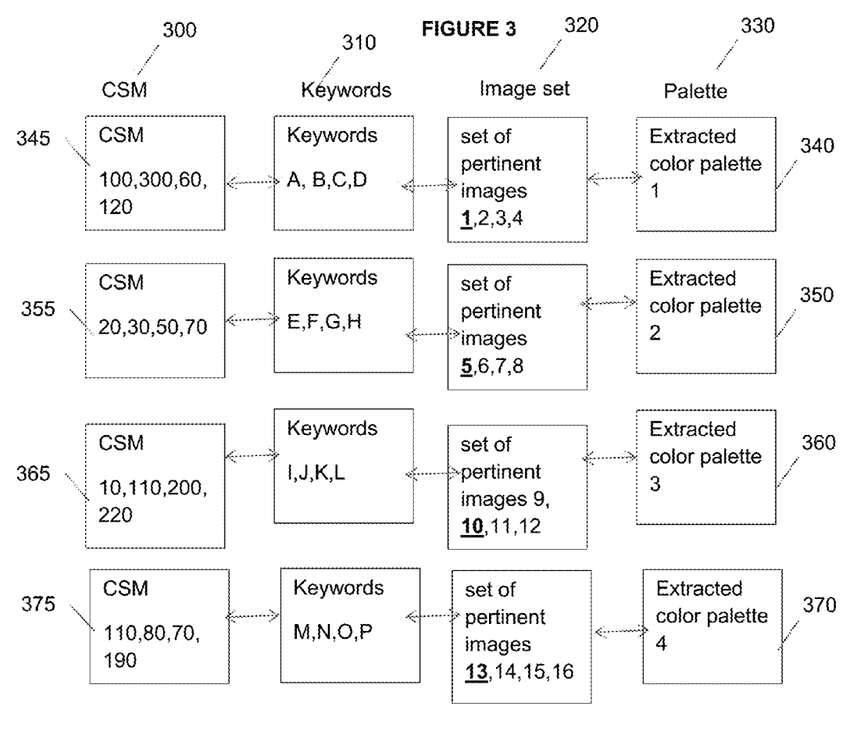
FIG. 3 depicts relationship between an Image set, a color palette derived from the image set, a set of keywords associated with images in the set of images, and a customer satisfaction measure (CSM) associated with each keyword associated with each image in the set of images according to one embodiment of the disclosed invention.

FIG. 3 depicts a relationship between an Image set, a color palette derived from the image set, a set of keywords associated with images in the set of images, and CSM associated with each keyword associated with each image in the set of images. Now referring to FIG. 3, where the first set of attributes 310 may comprise a set of keywords 310 associated with each image from the set of images 320. For example, FIG. 3 shows the set of images 320 containing images 1, 2, 3, and 4. For this image set, the first database may contain keywords associated with each of the images 1, 2, 3, and 4 in the set of images 320. However, for brevity, only keywords 310 that are associated with image 1 are illustrated in FIG. 3.

Notably the image for which the keywords are listed is indicated in bold and underlined font style in FIG. 3. Thus, images 1, 5, 10, and 13 are displayed in a bold and underlined style. Accordingly, the keywords 310 field indicating keywords A, B, C, and D, are associated with image 1, as seen in FIG. 3. Further, a second set of attributes which may be a set of customer satisfaction scores or customer satisfaction measure associated with each keyword in the set of keywords may also be stored in the first database. Accordingly, the CSM 345 indicating the values of 100, 300, 60, and 120 respectively associated with keywords A, B, C, and D, which in turn are associated with image 1 are illustrated in FIG. 3. For ease of explanation, one keyword and one image mapping is shown in FIG. 3. In other words, keywords A-P in FIG. 3 are shown to be associated with images 1-16 respectively. In reality however, a single keyword may be associated with multiple images, as discussed further in detail in conjunction with FIG. 7.

Further, the CSM 355 indicating the values of 20, 30, 50, and 70 respectively associated with keywords E, F, G, and H, which in turn are associated with image 5 are illustrated in FIG. 3. Likewise, the CSM 365 indicating the values 10, 110, 200, and 220 respectively associated with keywords I, J, K, and L, which in turn are associated with image 10 are illustrated in FIG. 3. Additionally, the CSM 375 indicating the values 110, 80, 70, and 190 respectively associated with keywords M, N, O, and P, which in turn are associated with image 13 are illustrated in FIG. 3.

Furthermore, a palette identification field 330 indicates palette identification denoting a palette extracted from the set of images 320. For example, the color palette 1 indicated by the reference numeral 340 may be extracted from the set of images containing images 1, 2, 3, and 4. Likewise, the color palette 2 indicated by the reference numeral 350 may be extracted from the set of images containing images 5, 6, 7, and 8. Further, the color palette 3 indicated by the reference numeral 360 may be extracted from the set of images containing images 9, 10, 11, and 12. Additionally, the color palette 4 indicated by the reference numeral 370 may be extracted from the set of images containing images 13, 14, 15 and 16.

In this embodiment, the first set of operations may comprise aggregating the customer behavior scores for each keyword across all images from which the next color palette was extracted from. As discussed above, for clarity distinct keywords are shown for each image set in FIG. 3, however, in reality several images may share a common keyword for example, as will be described later in conjunction with FIG. 7, the images 702, 704, and 706 all have an associated keyword "ocean" and varying scores for the keyword "ocean" such as images 702, 704, and 706 each have a CSM 10, 15 and 12. In this embodiment, for the color palette 708 and for keyword "ocean", the aggregate CSM after adding the CSM 10, 15 and 12 would be 37.

Figure 4:
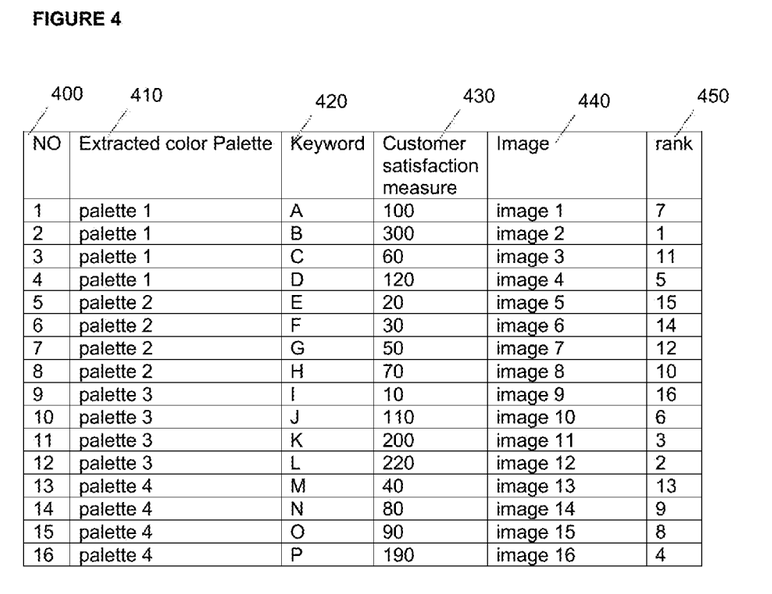
FIG. 4 indicates interrelationship between an image in the set of images, a keyword, extracted color palette, CSM, and rank for each image in the set of images.

FIG. 4 depicts an inter relationship between an image in the set of images, a keyword, extracted color palette, CSM, and rank for each image in the set of images. For simplicity, a single keyword is shown to be associated with a single image in FIG. 4. However, one image may be associated with more than one keyword and one keyword may be associated with more than one images. Number field 400 indicates the position of a given image-keyword-CSM pair in the table shown in FIG. 4. Extracted color palette 410 indicates a palette extracted from the image 440, keywords 420 may be associated with image 440, and CSM 430 may indicate the customer satisfaction measure for keyword 420 of image 440. A rank 450 may indicate the rank of a given palette, for example, palette 1 associated with image 2 and keyword B has the first rank because the keyword B associated with image 2 has the maximum CSM of 300, and palette 3 associated with image 10 and keyword I has the last rank ($16^{th}$) because the keyword I associated with image 10 has the lowest CSM of 10.

Accordingly, the disclosed method may ascertain an image rank measure for each image from the set of images by performing the first set of operations such as aggregating CSM for a keyword across all the images. The method may, based on the rank measure or ranking of each image in the set of images, generate a ranked display of the set of images associated with the set of suggested color palettes based on the image rank measure. In one embodiment of the disclosed invention, the rank 450 may be used for example to display a given image at a specific position on the user interface.

In this embodiment, the user interface may be, before determining a placement of given image, divided up in a set of portions and a priority may be assigned to each portions of the set of portions of the user interface. Accordingly, images 1-4 from which the color palette 1 is extracted, may be displayed at the most preferred position since the aggregate CSM for the color palette 1 is 560. Likewise, images 9-12 from which the color palette 3 is extracted, may be displayed at the second preferred position since the aggregate CSM for the color palette 3 is 530. Similarly, images 13-16 from which the color palette 4 is extracted, may be displayed at the third preferred position since the aggregate CSM for the color palette 4 is 400. Finally, images 5-8 from which the color palette 2 is extracted, may be displayed the least preferred position since the aggregate CSM for the color palette 2 is 170.

Figure 5:
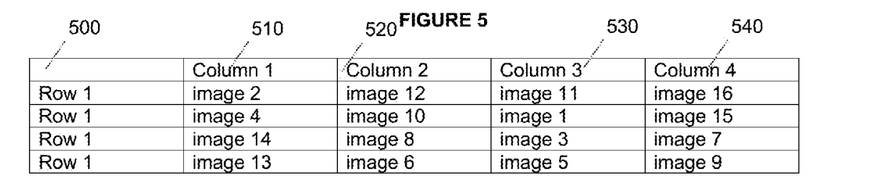
FIG. 5 depicts a first manner in which ranked images may be displayed on the user interface.

In another embodiment, the user interface may be divided up in columns and rows, wherein a specific location/area such as a specific column may be designated as a prime area where images having higher rank are to be placed. This feature is displayed in FIG. 5. Now referring to FIG. 5, depicting a first manner in which ranked images may be displayed on the user interface. For example, a row indicator 500 may indicate a row on the user interface and reference numerals 510, 520, 530 and 540 refer to columns 1, 2, 3, and 4 respectively. For example, the user interface may be divided up in four columns and four rows, where first column 510 may be designated as a prime area, thus images 2, 4, 14, and 13, which are images having top four ranks, maybe placed in the row 1-row 4 of the first column 510 respectively. Likewise, the second column 520 may be designated as a second prime area, thus images 12, 10, 8, and 6, which are images having top 4-8 ranks, maybe placed in the row 1-4 of the second column 520 respectively. Similarly, the third column 530 may be designated as a third prime area, thus images 11, 1, 3, and 5, which are images having top 8-12 ranks, maybe respectively placed in the row 1-4 of the third column 530. Finally, the fourth column 540 may be designated as a fourth prime area, thus images 16, 15, 7, and 9, which are images having top 12-16 ranks, maybe placed in the row 1-4 of the fourth column 540.

Figure 6:
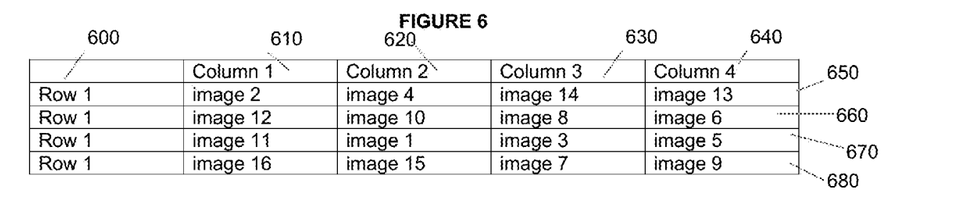
FIG. 6 depicts a second manner in which ranked images may be displayed on the user interface.

Alternatively, in this embodiment, the user interface may be divided up in columns and rows, wherein a specific row location/area such as a specific row is designated as a prime area where images having higher rank are to be placed. This feature is displayed in FIG. 6 depicting a second manner in which ranked images may be displayed on the user interface. A row indicator 600 may indicate a row on the user interface and reference numerals 610, 620, 630 and 640 refer to columns 1, 2, 3, and 4 respectively.

For example, the user interface may be divided up in four columns and four rows, where first row 650 may be designated as a prime area, thus images 2, 4, 14, and 13, which are images having top four ranks, maybe placed in the column 1-column 4 of the first row 650. Likewise, the second row 660 may be designated as a second prime area, thus images 12, 10, 8, and 6, which are images having top 4-8 ranks, maybe placed in the columns 1-4 of the second row 660. Similarly, the third row 670 may be designated as a third prime area, thus images 11, 1, 3, and 5, which are images having top 8-12 ranks, maybe placed in the column 1-4 of the third row 670. Finally, the fourth row 680 may be designated as a fourth prime area, thus images 16, 15, 7, and 9, which are images having top 12-16 ranks, maybe placed in the columns 1-4 of the fourth row 680.

In another embodiment of the disclosed invention, a download count for each keyword associated with each image from the set of images may be stored in the first database, wherein the download count for a given keyword associated with a given image may indicate the number of times the given image was downloaded by customers conducting image search for the given image using the given keyword. In this embodiment, the first set of operations may comprise aggregating the download count for each keyword across all images from which the next color palette was extracted from.

In yet another embodiment of the disclosed invention the first database may store a total number of download count for each image from the set of images, the total number of download count for a given image indicating the number of times the given image has been downloaded by customers since the image was added to the first database. In this embodiment, the first set of operations may comprise aggregating the download count across all images from which the next color palette was extracted from.

In one embodiment of the disclosed invention, the first set of operations may comprise aggregating the color volume count across all images from which the next color palette was extracted from. Alternatively, the first set of operations may comprise aggregating the color weight count across all images from which the next color palette was extracted from. In yet another embodiment of the disclosed invention, the disclosed method may comprise the step of ranking individual images based on the age count of the individual images.

In the preferred embodiment of the disclosed invention, the process may iterate through all the color palettes and derive the aggregate customer behavior score for each unique color palette by summing up all the customer behavior scores per search query for each unique color palette. For example, if 10 images with the same color palette have a customer behavior score of 2 for the search query "water", then the palette will have an aggregate customer behavior score of 20 for the query "water". Each image may have customer behavior scores for multiple search queries. In that case, the palette may include a sum of customer behavior scores for each individual search query across all images. This phenomenon is illustrated in FIG. 7.

Figure 7:
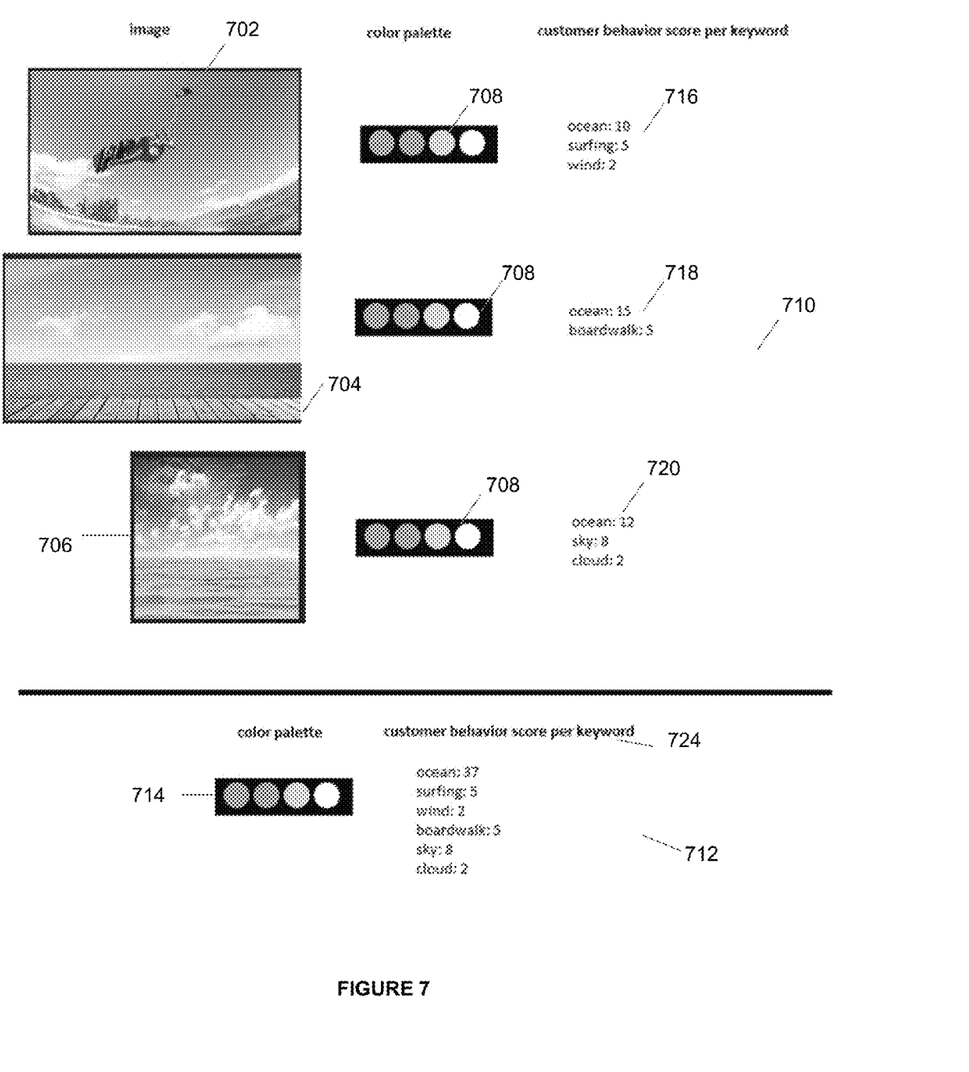

FIG. 7 depicts a manner in which the customer behavior scores per keyword are added up from each image that a palette was extracted from. Upon receiving a search query comprising search criteria, the process may retrieve a set of pertinent images having associated keywords that match the searched criteria. For each image in the set of pertinent images, the process may generate the color palettes and rank the color palettes based on the customer behavior score per each keyword. This process of aggregating the customer behavior score per each keyword is illustrated via three images 702, 704, and 706 displayed in the area 710 of FIG. 7.

Also displayed in the area 700 is the color palette 708 along with the customer behavior scores 716, 718, and 720. As for image 702, the color palette 708 is extracted from image 702, which is an image of a parasailing person. As described above, the first database may store information such as an image representation (image), a set of keywords associated with the given image, a customer behavior score for each keyword in the set of keywords, and a list of keywords previously used to locate the given image. In FIG. 7, three keywords: ocean, surfing and wind which are indicated by reference numeral 716 are associated with the given image 702. The customer behavior scores for each keyword associated with the given image 702 are stored in the first database. For example, the keywords ocean, surfing, and wind each have the customer behavior score of 10, 5 and 2 respectively.

Similarly, for image 704, the color palette 708 is extracted from image 702, which is an image of a boardwalk. In FIG. 7, two keywords: ocean and boardwalk indicated by reference numeral 718 are associated with the given image 704. The customer behavior scores for the keywords: ocean and boardwalk are 15 and 5 respectively. Also shown in FIG. 7 is image 706 which is an image of a sea. The color palette 708 is extracted from image 706 and three keywords: ocean, sky, and cloud indicated by reference numeral 720 are associated with the image 706. For image 706, the customer behavior scores for the keywords: ocean, sky, and cloud are 12, 8 and 2 respectively.

The process may aggregate the customer behavior scores per search query and use the customer behavior scores to identify most relevant keywords or categories for a given image. For example, as shown in area 712 of FIG. 7, for keyword ocean the process may add the customer behavior score 10 for image 702, the customer behavior score 15 for image 704 and the customer behavior score 12 for image 706, thus the aggregate customer behavior score 724 for keyword ocean is 37. Whereas the keyword surfing has the aggregate customer behavior score 5 since the keyword surfing only appeared once for image 702 with the customer behavior score 5. Similarly, in FIG. 7, the keywords wind, boardwalk, sky and cloud each have the aggregate customer behavior scores 2, 5, 8 and 2 respectively.

In one embodiment of the disclosed invention, the process may aggregate the customer behavior scores over a period of time and use the customer behavior scores to represent a customer activity for a specific period of interest. In another embodiment of the disclosed invention, the customer behavior score may be based on the previous searches indicating user interest in a given image. In this embodiment, the user interest may at least be indicated by one of the following: the user purchasing the given image, the user hovering a cursor over a thumbnail version of the given image to view an enlarged version of the given image, the user adding the given image to a favorites list, and the like.

Figure 8:
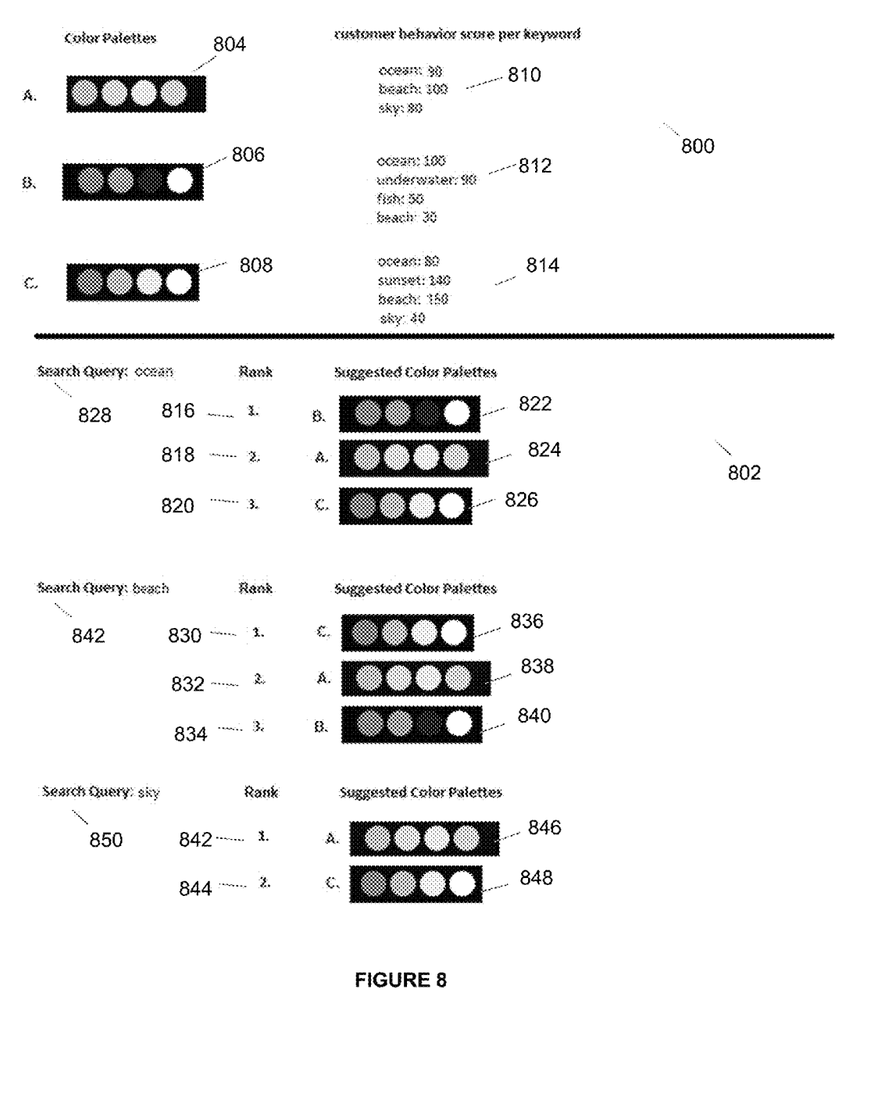
FIG. 8 illustrates a process of ranking the color palettes based on the customer behavior score of the keywords matching the search query.

Now referring to FIG. 8 illustrating a process of ranking the color palettes based on the customer behavior score of the keywords matching the search query. After performing the operations described in FIG. 7, the process may obtain a resulting data set containing color palettes linked to the sum of all the customer behavior scores from all the images that match a given color palette. This data can then be used to rank color palettes based on a search query. If palette A has a customer behavior score of 90 for keyword ocean, a score of 100 for keyword beach and a score of 80 for keyword sky, and palette B has a score of 100 for keyword ocean and a score of 30 for keyword beach, then palette A will be ranked first if the user enters a query for keyword beach and palette B will be ranked first if the user enters a query for keyword ocean. Resultantly, if a user invokes a query for keyword sky, then the process may display Palette A but may not display palette B to the user, since the keyword sky does not appear in palette B.

Displayed in the area 800 are the color palettes 804, 806, and 808 along with the customer behavior scores 810, 812, and 814. The color palette 804 has three associated keywords: ocean, beach, and sky, the customer behavior scores 810 for these keywords are 90, 100 and 80 respectively. Likewise, the color palette 806 has four associated keywords: ocean, underwater, fish, and beach, where the customer behavior scores 812 for these keywords are 100, 90, 50 and 30 respectively. Finally, the color palette 808 has four associated keywords: ocean, sunset, beach, and sky, where the customer behavior scores 814 for these keywords are 80, 140, 150, and 40 respectively.

Now referring to the display area 802 in FIG. 8 showing a ranked display of the suggested color palettes per search query. For the search query 828 where images for the keyword ocean are being searched, the customer behavior score for this keyword is 90 for palette A, 100 for palette B, and 80 for palette C. Thus, the first rank 816 is allocated to the suggested color palette B referenced by the reference numeral 822. Similarly, the second rank 818 is allocated to the suggested color palette A referenced by the reference numeral 824 and the third rank 820 is allocated to the suggested color palette C referenced by the reference numeral 826.

Likewise for the search query 842 where images for the keyword beach are being searched, the customer behavior score for this keyword is 100 for palette A, 30 for palette B, and 150 for palette C. Accordingly, the first rank 830 is allocated to the suggested color palette C referenced by the reference numeral 836. The second rank 832 and the third rank 834 are allocated to the suggested color palette A referenced by the reference numeral 838 and the suggested color palette B referenced by the reference numeral 840 respectively.

Similarly, for the search query 850 where images for the keyword sky are being searched, the customer behavior score for this keyword is 80 for palette A, and 40 for palette C. Therefore, the first rank 842 is allocated to the suggested color palette A referenced by the reference numeral 846 and the second rank 844 is allocated to the suggested color palette C referenced by the reference numeral 848. Notably, because the keyword sky is not associated with the images from which the color palette B is derived from, the color palette B referenced by the reference numeral 806 is not listed in the ranked display of suggested color palette for the search query for the keyword sky.

We claim:

1. A method for ranking images comprising:
   receiving user search criteria from a user interface of a computing device;
   searching a first database to locate a set of pertinent images satisfying the search criteria;
   extracting a set of suggested color palettes from the set of pertinent images;
   ascertaining an image rank measure for each image from a set of images from which each color palette is extracted from based on an aggregate of customer satisfaction scores associated with each keyword associated with each image in the set of images, aggregate download count for each keyword associated with each image from the set of images, aggregate color volume count for each image from the set of images, or aggregate color weight count for each image from the set of images; and
   generating for placement on the user interface a ranked display of the set of images associated with the set of suggested color palettes based on the image rank measure,
   wherein the user interface is divided into separate portions before placement of the images from the set of images, each portion having an associated priority value, and
   wherein generating the ranked display of the set of images comprises placing images from the set of images have a higher image rank measure in a portion of the user interface having a higher associated priority value.

2. The method of claim 1, further comprising the step of maintaining in the first database: an image representation, a set of keywords associated with the image, a customer behavior score for each keyword in the set of keywords, and a list of keywords previously used to locate the image.

3. The method of claim 1, further comprising the step of maintaining in the first database a download count for each keyword associated with each image from the set of images, wherein the download count for a given keyword associated with a given image indicates the number of times the given image was downloaded by customers conducting image search for the given image using the given keyword.

4. The method of claim 1, wherein the first database further comprises a total number of downloads count for each image from the set of images, wherein the total number of downloads count for a given image indicates the number of times the given image has been downloaded by customers since the image was added to the first database.

5. The method of claim 1, further comprising the step of maintaining in the first database a color volume count for an individual color for each image from the set of images, wherein the color volume count for an image indicates the percentage of the image that is covered by the individual color.

6. The method of claim 1, wherein the first database further comprises a color weight count for an individual color for each image from the set of images.

7. The method of claim 1, further comprising the step of maintaining in the first database an age count for each image from the set of images, wherein the age count for a given image indicates the time when the given image added to the first database.

8. The method of claim 7, wherein the image rank measure for each image is further ascertained by ranking individual images based on the age count of the individual images.

9. A system for ranking images comprising:
   a memory comprising instructions;
   one or more processors configured to execute the instructions to:
     receive user search criteria from a user interface of a computing device;
     search a first database to locate a set of pertinent images satisfying the search criteria;
     extract a set of suggested color palettes from the set of pertinent images;
     ascertain an image rank measure for each image from a set of images from which each color palette is extracted from based on an aggregate of customer satisfaction scores associated with each keyword associated with each image in the set of images, aggregate download count for each keyword associated with each image from the set of images, aggregate color volume count for each image from the set of images, or aggregate color weight count for each image from the set of images; and
     generate for placement on the user interface a ranked display of the set of images associated with the set of suggested color palettes based on the image rank measure,
   wherein the user interface is divided into separate portions before placement of the images from the set of images, each portion having an associated priority value, and
   wherein generating the ranked display of the set of images comprises placing images from the set of images have a higher image rank measure in a portion of the user interface having a higher associated priority value.

10. The system of claim 9, wherein the one or more processors are further configured to maintain in the first database: an image representation, a set of keywords associated with the image, a customer behavior score for each keyword in the set of keywords, and a list of keywords previously used to locate the image.

11. The system of claim 9, wherein the one or more processors are further configured to maintain in the first database a download count for each keyword associated with each image from the set of images, wherein the download count for a given keyword associated with a given image indicates the number of times the given image was downloaded by customers conducting image search for the given image using the given keyword.

12. The system of claim 9, wherein the first database comprises a total number of downloads count for each image from the set of images, wherein the total number of downloads count for a given image indicates the number of times the given image has been downloaded by customers since the image was added to the first database.

13. The system of claim 9, wherein the one or more processors are further configured to maintain in the first database a color volume count for an individual color for each image from the set of images, wherein the color volume count for an image indicates the percentage of the image that is covered by the individual color.

14. The system of claim 9, wherein the first database comprises a color weight count for an individual color for each image from the set of images.

15. The system of claim 9, wherein the one or more processors are further configured to maintain in the first database an age count for each image from the set of images, wherein the age count for a given image indicates the time when the given image added to the first database.

16. The system of claim 15, wherein the image rank measure for each image is further ascertained by ranking individual images based on the age count of the individual images.

* * * * *